(12) United States Patent
Oohira

(10) Patent No.: US 8,872,782 B2
(45) Date of Patent: Oct. 28, 2014

(54) DISPLAY DEVICE

(75) Inventor: Eiji Oohira, Mobara (JP)

(73) Assignee: Japan Display Inc., Tokyo (JP)

( * ) Notice: Subject to any disclaimer, the term of this patent is extended or adjusted under 35 U.S.C. 154(b) by 67 days.

(21) Appl. No.: 13/590,259

(22) Filed: Aug. 21, 2012

(65) Prior Publication Data

US 2013/0050115 A1  Feb. 28, 2013

(30) Foreign Application Priority Data

Aug. 23, 2011  (JP) .................................. 2011-181830

(51) Int. Cl.
*G06F 3/041* (2006.01)
*G06F 3/044* (2006.01)

(52) U.S. Cl.
CPC ................ *G06F 3/041* (2013.01); *G06F 3/044* (2013.01)
USPC .......................................... 345/173; 345/174

(58) Field of Classification Search
CPC .......... G06F 3/041; G06F 3/044; G06F 3/045
USPC ......... 345/173, 174; 178/18.01, 18.03, 18.05, 178/18.06
See application file for complete search history.

(56) References Cited

U.S. PATENT DOCUMENTS

| | | | |
|---|---|---|---|
| 2005/0099402 A1* | 5/2005 | Nakanishi et al. | ............ 345/173 |
| 2010/0231545 A1* | 9/2010 | Inaba et al. | ................... 345/173 |
| 2011/0018837 A1* | 1/2011 | Chen et al. | ..................... 345/174 |
| 2011/0050612 A1 | 3/2011 | Matsumoto et al. | |
| 2011/0181545 A1 | 7/2011 | Takahashi et al. | |

FOREIGN PATENT DOCUMENTS

| | | |
|---|---|---|
| JP | 04-092325 | 3/1992 |
| JP | 2011-48055 | 3/2011 |
| JP | 2011-154442 | 8/2011 |

OTHER PUBLICATIONS

Communication in connection with corresponding Foreign Japanese Application No. 2011-181830, mailed Aug. 12, 2014 with English translation.

* cited by examiner

*Primary Examiner* — Regina Liang
(74) *Attorney, Agent, or Firm* — Antonelli, Terry, Stout & Kraus, LLP.

(57) ABSTRACT

The display device according to the present invention has a display panel as well as a touch panel and a front window provided on the display panel on the front side, where the touch panel has a base made of a film and wires formed on the surface of the base, while the connection portion B for connecting the touch panel and the flexible printed circuit is provided in a protrusion of the base, the touch panel and the front window are pasted together with an adhesive layer in between, and at least the adhesive layer is not provided to the protrusion.

6 Claims, 5 Drawing Sheets

DISPLAY DEVICE

CROSS-REFERENCE TO RELATED APPLICATION

The present application claims priority over Japanese Patent Application JP2011-181830 filed on Aug. 23, 2011, the contents of which are hereby incorporated into this application by reference.

BACKGROUND OF THE INVENTION (1) Field of the Invention

The present invention relates to a display device, and in particular, to a display device having a touch panel and a front window on the front side of the display panel.

(2) Description of the Related Art

Various types of display devices, such as liquid crystal modules (liquid crystal display devices) and organic electroluminescent display devices, are used for many portable information apparatuses, such as cellular phones, personal digital assistants (PDAs), digital cameras and multimedia players.

In recent years, the display device of various types of apparatuses has been provided with a touch panel on the front surface of the display panel as an input apparatus for these. In addition, a front window has also been provided in order to protect the touch panel and the display panel. JP2011-048055A discloses the structure where a touch panel and a front window are provided on the front surface of a liquid crystal display device.

FIGS. 1 to 4 are diagrams showing the prior art for illustrating a state where a capacitive touch panel and a front window are connected together. FIG. 1 shows a state where a flexible printed circuit 2 is connected to a capacitive touch panel 1. FIG. 1 shows the front surface side of the touch panel 1, and a wire pattern, not shown, is provided on a film formed on the surface of the touch panel. A flexible printed circuit is usually connected to the touch panel 1 on the same surface as that on which a film is formed.

As shown in FIG. 2, a group of electronic parts, including a control IC (file), is mounted on the flexible printed circuit 2. Therefore, as a general specification, a reinforcing plate 3 made of polyimide or the like is provided on the rear surface of the board where the electronic parts are mounted. FIG. 2 is a diagram showing the touch panel 1 as viewed from the rear. A terminal portion 4 for interface is provided at one end of the flexible printed circuit 2.

FIG. 3 shows a state where a front window 6 is mounted on and pasted to the touch panel 1 in FIG. 1 on the front surface side with an adhesive layer in between. FIG. 4 is a cross-sectional diagram along one-dot chain line A-A'. The base of the touch panel 1 is made of glass, and thus has high physical strength and low flexibility. Therefore, it is necessary for the adhesive layer 7 to be thicker than the flexible printed circuit 2.

SUMMARY OF THE INVENTION

It has been demanded that display devices be made thinner, and thus, it is necessary to make not only the display panels thinner, but also make the touch panels, the front windows provided on the front side of the display panel, and the adhesive layers, such as the adhesive layer 7, for pasting the touch panel and front window together thinner.

The touch panel 1 can be made thinner by using a film for the base, which is made of glass. Even in this case, however, it is necessary for the adhesive layer 7 to be thicker than the flexible printed circuit 2 that is connected to the touch panel 1, and therefore, the display device cannot be made sufficiently thin. In the case where the thickness of the flexible printed circuit 2 is 60 µm, for example, it is necessary for the adhesive layer 7 to be as thick as 60 µm at minimum.

It is also possible to provide a structure where the flexible printed circuit is not placed on the adhesive layer 7 side by pasting the front window to the touch panel 1 on the rear side (on the side of the surface shown in FIG. 2). In this case, the adhesive layer 7 itself can be made thin, but the flexible printed circuit 2 for the touch panel is placed between the touch panel and the display panel, which ends up causing the distance between the touch panel and the display panel to be greater, and thus, the entirety of the device is prohibited from being made thinner.

In addition, a film having a wire pattern formed on the front surface of the touch panel is placed on the opposite side of the adhesive layer 7 (on the side that is not hidden by the front window). This film is weak against physical stress, which increases a risk of damaging the film, at the time of the process for pasting the touch panel to the front window or during handling after pasting. In the case where a protective film is pasted to the film in order to protect the film, the thickness of the entire touch panel increases, and thus, a sufficient reduction in the thickness is not achieved.

Furthermore, the touch panel 1 and the flexible printed circuit 2 are connected together through thermal adhesion with an anisotropic conductive film in between. In the case where a film is used as the base of the touch panel 1, however, it is easy for the film base to thermally deform. When the base is thermally damaged and the surface becomes uneven, it is difficult to detect the capacitance for the touch panel with precision, and in addition, other problems arise such that the images on the display panel are distorted.

An object to be achieved by the present invention is to solve the above-described problems and provide a display device having a front window and a touch panel, where a reduction in the thickness has been achieved and defects with the detection on the touch panel, defective image on the display and other problems can be prevented.

In order to achieve the above-described object, the display device according to the present invention has the following characteristics in the structure.

(1) A display device, having; a display panel; and a touch panel and a front window provided on the display panel on a front side, is characterized in that the touch panel has a base made of a film and wires formed on a surface of the base, and a connection portion for connecting the touch panel to a flexible printed circuit is provided in a protrusion of the base, and the touch panel and the front window are pasted together with an adhesive layer in between, and at least the adhesive layer is not provided to the protrusion.

(2) The display device according to the above (1) is characterized in that the thickness of the adhesive layer is less than the thickness of the flexible printed circuit.

(3) The display device according to the above (1) or (2) is characterized in that the connection portion is located inside the outermost periphery of the front window.

(4) The display device according to any of the above (1) to (3) is characterized in that the connection portion between the touch panel and the flexible printed circuit is formed as a result of the connection through thermal adhesion.

(5) The display device according to any of the above (1) to (4) is characterized in that an IC chip for controlling the touch panel is provided on the flexible printed circuit.

According to the present invention, the base of the touch panel is made of a film and the connection portion for connecting the touch panel and the flexible printed circuit is provided in a protrusion of the base, and therefore, it is possible for the thickness of the adhesive layer to be less than the thickness of the flexible printed circuit when the touch panel and the front window are pasted together.

Even in the case where the flexible printed circuit moves while being handled, it is difficult for the physical stress to be applied to the adhesive layer, and the effects on the adhesive layer area within the region visible from the outside can be avoided, and thus, it is possible to prevent the image quality of the display from deteriorating.

Though heat is applied to the film, which is the base of the touch panel, when the touch panel and the flexible printed circuit are connected, the portion to which heat is applied is the protrusion of the base, and therefore, the adhesive layer side is not affected or damaged by the heat (thermal deformation), and thus, the reliability of the pasting using an adhesive layer and the quality of the appearance can be prevented from being lowered. In addition, the film having a wire pattern formed on the touch panel can be prevented from being deformed, and thus, it is possible to stabilize the sensing performance of the touch panel.

Instead of expanding the entirety of the screen, which is the surface for detection on the touch panel and is a region through which an image can be seen, a protrusion is formed in a part within the width that is required for the connection with the flexible printed circuit, and thus, it is possible to provide a part mounted within the display device around the protrusion or to secure a region where the front window is pasted to the housing.

Furthermore, the base of the screen of the touch panel is made of a film, and therefore, it is easy to process it into a different form with a protrusion in comparison with that made of glass, and in addition, it is possible to use the flexibility of the protrusion.

DESCRIPTION OF THE EMBODIMENTS

The display device according to the present invention is described below in detail.

Figure 1:
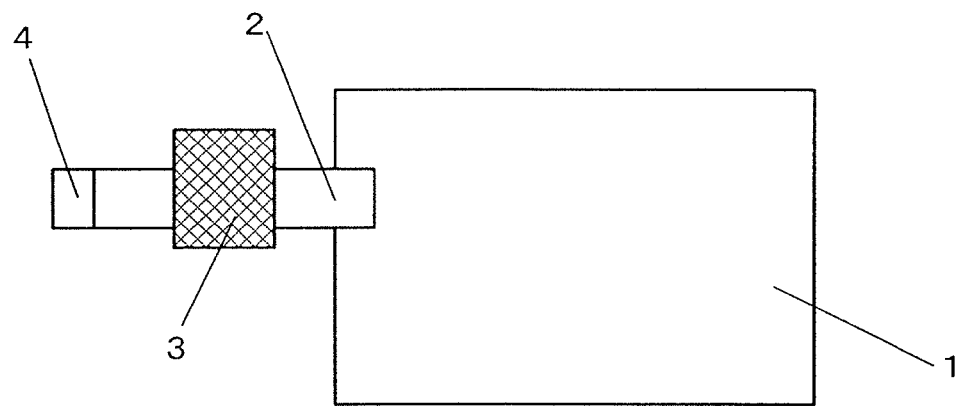
FIG. 1 is a plan diagram showing the front side of a conventional touch panel.
Figure 2:
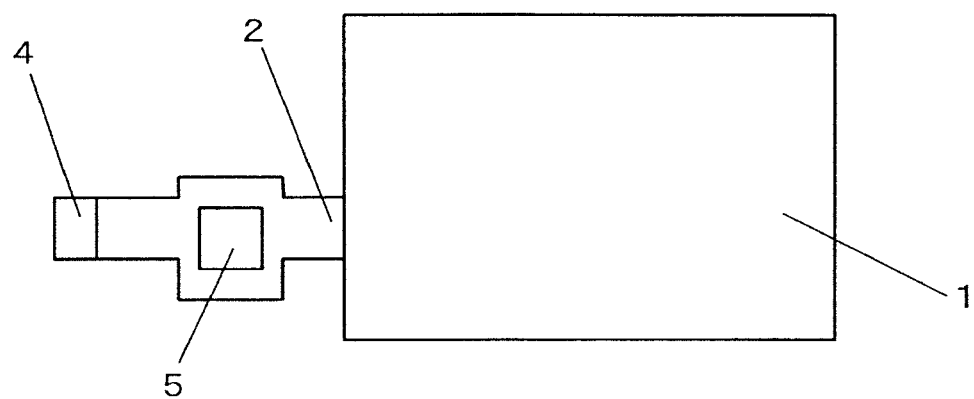
FIG. 2 is a plan diagram showing the rear side of the conventional touch panel.
Figure 3:
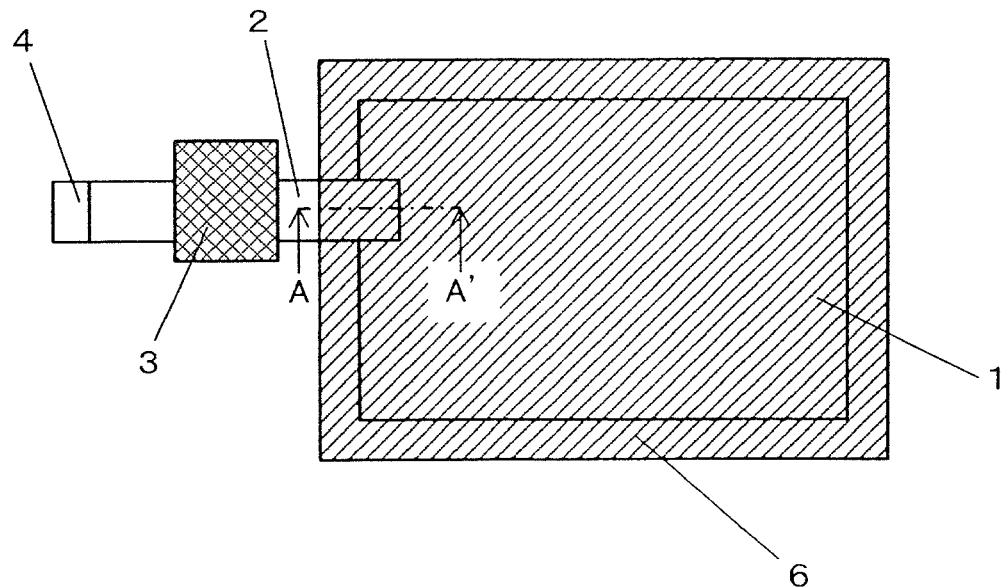
FIG. 3 is a plan diagram showing a state where a front window and the touch panel are pasted together according to the prior art.
Figure 4:
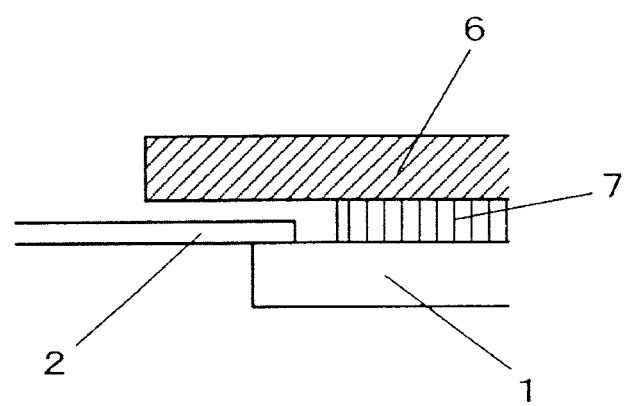
FIG. 4 is a cross-sectional diagram along one-dot chain line A-A' in FIG. 3.
Figure 5:
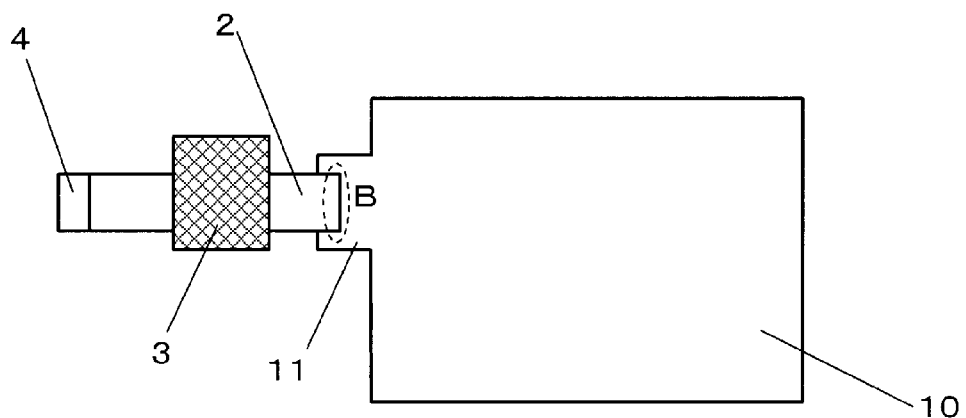
FIG. 5 is a plan diagram showing the front side of the touch panel used in the display device according to the present invention.

The present invention relates to a display device having a display panel as well as a touch panel and a front window provided on the front surface of the display panel. The touch panel 10 has a base made of a film and wires (not shown) formed on the surface of the base. As shown in FIG. 5, the connection portion B between the touch panel 10 and the flexible printed circuit 2 is provided to a protrusion 11 when the base is viewed from the front. The touch panel and the front window are pasted together with an adhesive layer in between through the region through which images from the display panel can be seen (screen) and are characterized in that at least the adhesive layer is not provided to the protrusion.

Unlike a conventional base made of glass, the base of the touch panel 10 according to the present invention is made of a film, which is a sheet made of a transparent resin, such as acryl or polycarbonate. According to the feature of the present invention, as shown in FIG. 5, the touch panel 10 is provided with a protrusion 11 in the main region, which is rectangular as viewed from the front. In addition, the touch panel 10 has a surface for detection, and a wire pattern in stripes is formed of a transparent conductive film, such as of ITO, in a region (screen) through which an image on the display panel can be seen. The wire pattern includes wires used to measure the capacitance. Naturally, it is possible to form the wire pattern in two or more layers, and in this case, insulating layers, such as of $SiO_2$ films or SiN films, are intervened between the layers in the wire pattern.

The touch panel 10 and the flexible printed circuit 2 are connected through thermal adhesion with an anisotropic conductive film (not shown) in between in the region B. According to the present invention, a protrusion 11 is formed in the touch panel, and therefore, the film base in the screen can be prevented from thermally deforming due to the heat for connecting the flexible printed circuit 2, even though the base of the touch panel 10 is made of a film.

Figure 6:
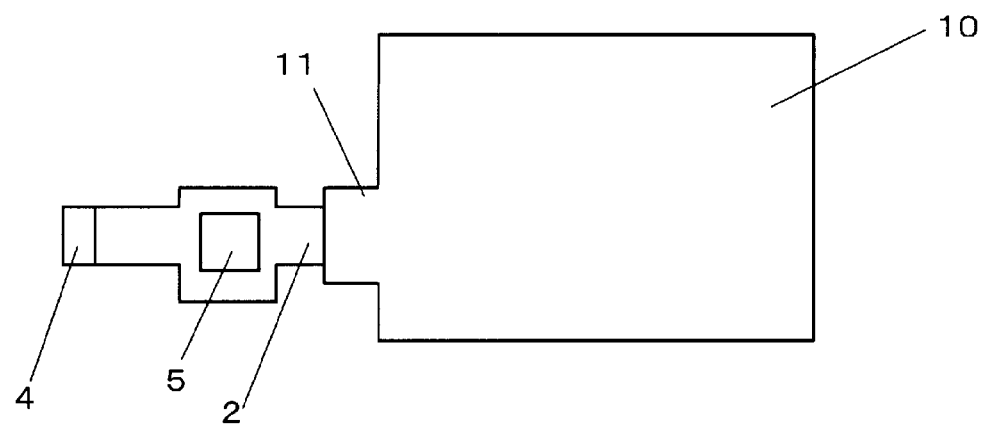
FIG. 6 is a plan diagram showing the rear side of the touch panel used in the display device according to the present invention.

FIG. 6 is a plan diagram showing the touch panel 10 as viewed from the rear. A group of electronic parts, including a control IC (5) for an arithmetic process of the capacitance, is mounted on the flexible printed circuit 2. As shown in FIG. 5, a reinforcing plate 3 made of polyimide or the like can be provided on the rear surface of the board on which the electronic parts are mounted. A terminal portion 4 for interface is provided at one end of the flexible printed circuit 2.

Figure 7:
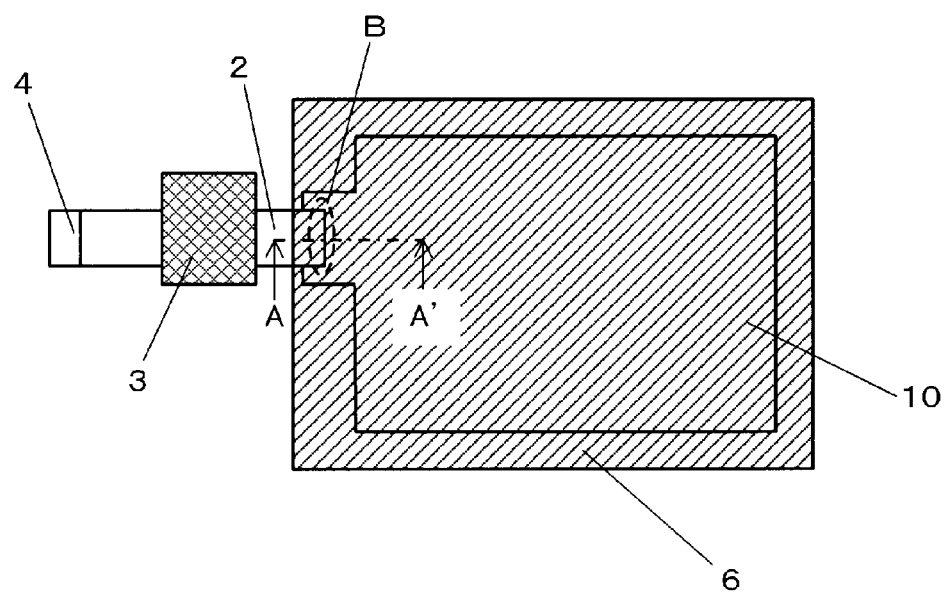
FIG. 7 is a plan diagram showing a state where the front window and the touch panel are pasted together in the display device according to the present invention.
Figure 8:
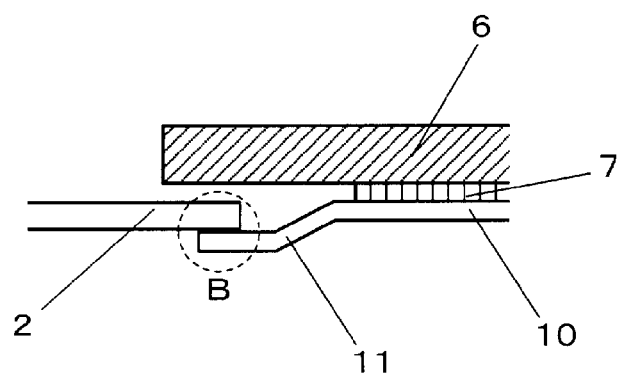
FIG. 8 is a cross-sectional diagram along one-dot chain line A-A' in FIG. 7.

FIG. 7 shows a state where a front window 6 is mounted on and pasted to the touch panel 10 in FIG. 5 on the front side with an adhesive layer in between. FIG. 8 is a cross-sectional diagram along one-dot chain line A-A'. An adhesive layer 7 is provided to the screen of the touch panel so that the front window 6 and the touch panel 10 are integrated. Here, the adhesive layer 7 is not provided to the protrusion 11 and the base of the touch panel 10 is made of a film, and therefore, it is possible to use the flexibility of the protrusion. As a result, as shown in FIG. 8, it is possible for the thickness of the adhesive layer 7 to be less than the thickness of the flexible printed circuit 2.

Not only glass but also resin-based materials, such as acryl-based materials, are appropriate for use in the front window. It is also possible to use reinforced glass with a scattering prevention film pasted thereto.

As shown in FIG. 7, the connection portion B between the touch panel 10 and the flexible printed circuit 2 is located inside the outermost periphery of the front window 6 in the structure. In this case as well, as shown in FIG. 8, it is possible to provide part of the flexible printed circuit 2 on the rear side of the front window without increasing the thickness of the adhesive layer 7. In addition, it is possible to provide a part mounted within the display device around the protrusion and to secure an adhesive region when the front window is pasted to the housing of the display device. An unnecessary increase in the amount of the protrusion reduces the number of touch panels that are cut out from one film. Therefore, the amount of the protrusion 11 is determined, taking into consideration the adhesive region for the flexible printed circuit and the length through which heat can be conveyed that can damage the system as a result of heat treatment.

Figure 9:
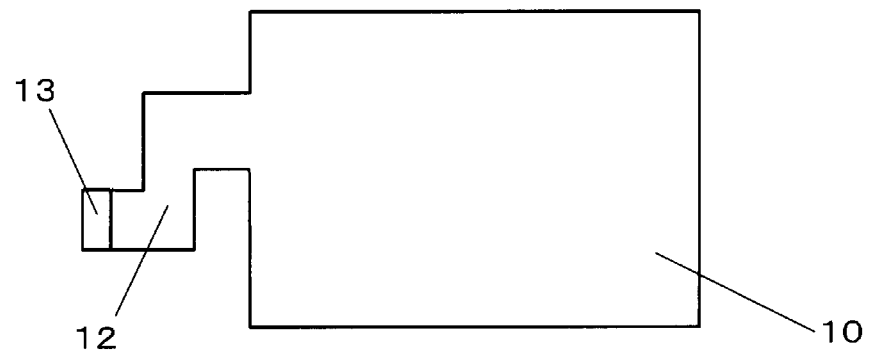
FIG. 9 is a plan diagram showing an example of the application of the touch panel used in the display device according to the present invention.

The shape of the protrusion is not limited to that shown in FIG. 5, and it is possible to use various shapes, including a crank shape (12) as shown in FIG. 9 and shapes that protrude in S-shape or L-shape. As that shown in FIG. 9, when the length between the route of the protrusion (the portion from which the protrusion protrudes from the screen) and the connection portion 13 for the flexible printed circuit is long, not only can heat damage be prevented, but also physical damage on the screen (rectangular area in the touch panel 11) can be reduced when an external force is applied to the flexible printed circuit 2.

As described above, according to the present invention, a reduction in the thickness of the display device having a front window and a touch panel can be achieved, and at the same time, it is possible to provide a display device where defects in the detection on the touch panel, defective image on the display and other problems can be prevented.

What is claimed is:

1. A display device, comprising: a display panel; and a touch panel and a front window provided on the display panel on a front side, characterized in that the touch panel has a base made of a film and wires formed on a surface of the base, and a connection portion for connecting the touch panel to a flexible printed circuit is provided in a protrusion of the base, the touch panel and the front window are pasted together with an adhesive layer in between, and at least the adhesive layer is not provided to the protrusion of the base of the touch panel, and the protrusion of the base of the touch panel is configured so that a space between the connection portion of the protrusion and the front window is larger than a space between a part of the touch panel corresponding to a display area of the display panel and the front window.

2. The display device according to claim 1, characterized in that the configuration of the protrusion enables a thickness of the adhesive layer which parts the touch panel and the front window together to be less than a thickness of the flexible printed circuit.

3. The display device according to claim 1, characterized in that the connection portion of the protrusion is located inside the outermost periphery of the front window.

4. The display device according to claim 1, characterized in that the connection portion of the protrusion which enables connection between the touch panel and the flexible printed circuit is formed as a result of the connection through thermal adhesion.

5. The display device according to claim 1, characterized in that an IC chip for controlling the touch panel is provided on the flexible printed circuit.

6. The display device according to claim 2, characterized in that the adhesive layer extends between opposing surfaces of the touch panel and the front window to delimit the thickness thereof.

* * * * *